(12) United States Patent
Kibkalo et al.

(10) Patent No.: US 7,493,258 B2
(45) Date of Patent: Feb. 17, 2009

(54) METHOD AND APPARATUS FOR DYNAMIC BEAM CONTROL IN VITERBI SEARCH

(75) Inventors: Alexandr A. Kibkalo, Sarov (RU); Vyacheslav A. Barannikov, Sarov (RU)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 10/482,400

(22) PCT Filed: Jul. 3, 2001

(86) PCT No.: PCT/RU01/00264

§ 371 (c)(1), (2), (4) Date: Jan. 10, 2005

(87) PCT Pub. No.: WO03/005344

PCT Pub. Date: Jan. 16, 2003

(65) Prior Publication Data

US 2005/0143995 A1    Jun. 30, 2005

(51) Int. Cl.
*G10L 15/00* (2006.01)
(52) U.S. Cl. .................. 704/242; 704/250; 704/256
(58) Field of Classification Search .......... 704/242, 704/256.1, 256.5, 250, 256
See application file for complete search history.

(56) References Cited

U.S. PATENT DOCUMENTS 6,904,402 B1 *  6/2005  Wang et al. .................. 704/10

OTHER PUBLICATIONS

Ramachandran, R. P., & Mammone, R. (Eds.). (1995). Modern methods of speech processing. Norwell, MA: Kluwer Academic Publishers.*
William Rucklidge, Efficient Visual Recognition Using the Hausdorff Distance, Springer-Verlag New York, Inc., Secaucus, NJ, 1996.*

* cited by examiner

*Primary Examiner*—Daniel D Abebe
(74) *Attorney, Agent, or Firm*—Blakely, Sokoloff, Taylor & Zafman LLP

(57) ABSTRACT

A method is presented including selecting an initial beam width. The method also includes determining whether a value per frame is changing. A beam width is dynamically adjusted. The method further decides a speech input with the dynamically adjusted beam width. Also, a device is presented including a processor (420). A speech recognition component (610) is connected to the processor (420). A memory (410) is connected to the processor (420). The speech recognition component (610) dynamically adjusts a beam width to decode a speech input.

19 Claims, 6 Drawing Sheets

METHOD AND APPARATUS FOR DYNAMIC BEAM CONTROL IN VITERBI SEARCH

BACKGROUND OF THE INVENTION

1. Field of the Invention

This invention relates to speech recognition, and more particularly to a method and apparatus for dynamic beam control in a Viterbi search.

2. Description of the Related Art

Speech or voice recognition has become very popular to increase work efficiency. Several techniques are used in speech recognition processes to recognize human voice. Speech recognition also functions as a pipeline to convert digital audio signals coming from devices, such as a personal computer (PC) sound card, to recognized speech. These signals may pass through several stages, where various mathematical and statistical processes are used to determine what has actually been said.

Many speech recognition applications have databases containing thousands of frequencies or "phonemes" (also known as "phones" in speech recognition systems). A phoneme is the smallest unit of speech in a language or dialect (i.e., the smallest unit of sound that can distinguish two words in a language). The utterance of one phoneme is different from another. Therefore, if one phoneme replaces another in a word, the word would have a different meaning. For example, if the "B" in "bat" were replaced by the phoneme "R," the meaning would change to "rat." The phoneme databases are used to match the audio frequency bands that were sampled. For example, if an incoming frequency sounds like a "T," an application will try to match it to the corresponding phoneme in the database. Also, adjacent phones, known as context, can effect pronunciation. For example, the "T" in "that" sounds different from the "T" in, "truck." The phone with fixed left (right) context is generally knows as a "left (right) biphone." The phone with fixed left and right contexts is knows as a "triphone." The phoneme databases may contain many entries for each phoneme corresponding to bi- or triphones. Each phoneme is tagged with a feature number, which is then assigned to the incoming signal.

There can be so many variations in sound due to how words are spoken that it is almost impossible to exactly match an incoming sound to an entry in the database. Moreover, different people may pronounce the same word differently. Further, the environment also adds its own share of noise. Thus, applications must use complex techniques to approximate an incoming sound and figure out which phonemes are being used.

Another problem in speech recognition involves determining when a phoneme (or smaller units) ends and the next one begins. For problems like this, a technique called hidden Markov model (HMM) may be implemented. A HMM provides a pattern matching approach to speech recognition.

An HMM is generally defined by the following elements: First, the number of states in the model, N; next, a state-transition matrix A where $a_{ij}$ is the probability of the process moving from state $q_i$ to state $q_j$ at time t=1, 2, ... and given that the process is at state $q_i$ at time t−1; the observation probability distribution, $b_i(\vec{o})$, i=1 ..., N for all states, $q_i$, i=1, ... N; and the initial state probability $\pi_i$ for i=1, ... N.

In order to perform speech recognition using a HMM, languages are typically broken down into a limited group of phonemes. For example, the English language may be broken down into approximately 40-50 phonemes. One should note, however, that if other units are used, such as tri-phones, the limited group may consist of several thousands of tri-phones. A stochastic model of each of the units (i.e., phones) is then created. Given an acoustical observation, the most likely phoneme corresponding to the observation can then be determined. One should note, however, that if context units are used, such as bi-phones or tri-phones, the limited group may consist of several thousands of units. Therefore, a stochastic model for each of the units would be created. A method for determining the most likely phoneme corresponding to the acoustical observation uses Viterbi (named after A. J. Viterbi) scoring.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to a method for dynamic beam control in a Viterbi search. Referring to the figures, exemplary embodiments of the invention will now be described. The exemplary embodiments are provided to illustrate the invention and should not be construed as limiting the scope of the invention.

Figure 1:
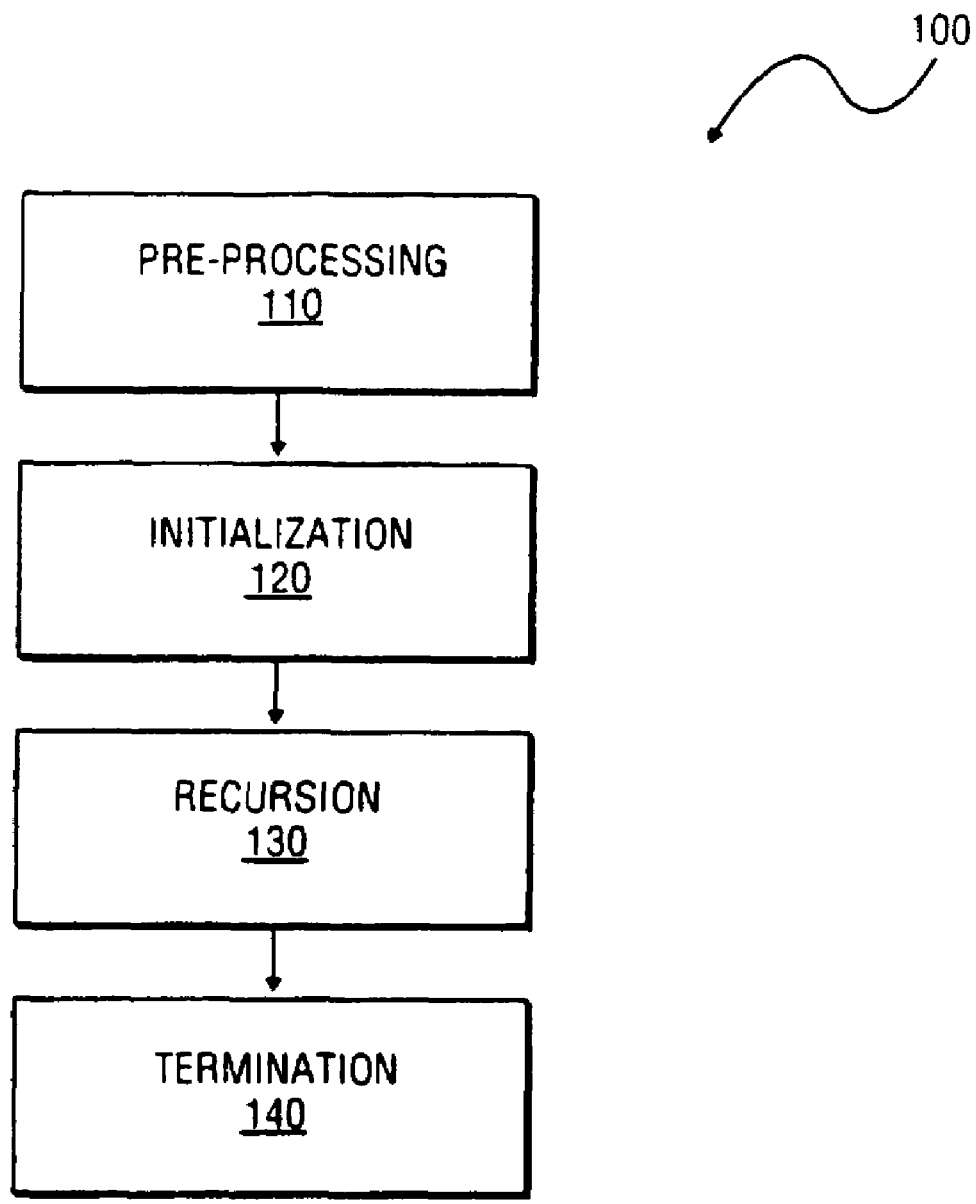
FIG. 1 illustrates four stages of a typical Viterbi search algorithm.

FIG. 1 illustrates four stages of typical Viterbi search algorithm. This Viterbi method compares the acoustical observation against a stochastic model of a phoneme in order to determine a probability that this observation corresponds to that phoneme. Viterbi scoring determines the single best state sequence, i.e., the state transition path that yields the highest probability of the observation matching the model. This same determination is performed for each of the 40-50 phonemes (or other smaller units, such as tri-phones) of the English language. In this manner, the phoneme with the highest probability of matching the acoustical observation is determined. If the acoustical observation includes more than one phoneme, such as the spoken word, then the above technique can be repeated to determine a set of the most likely phonemes corresponding to the acoustical observation. In a speech recognition system, after a model is completed, for example the decoding of the work "ask," the system would choose all possible continuations, concatenate the HMMs corresponding to the continuations, and decoding would continue. For example, after decoding the second tri-phone "AE−S+K," the speech recognition system could choose tri-phones "S−K+*" (where * represents any other phone). Then, after decoding a portion of the input data (e.g., corresponding to a sentence or several words), the speech recognition system chooses the best hypotheses as a result.

The Viterbi algorithm is commonly used in HMM speech recognition. The Viterbi search algorithm is typically used to find the best word sequence that matches the speech to be recognized. Here, the matching is in terms of statistical likelihood values, and the search is through all possible word sequences. For large vocabulary systems, the search space increases dramatically. To be precise, the search space increases as $N^L$, where N is the vocabulary number and L is the length of the hypothesized sentence.

To avoid search space explosion, beam control is a technique used in the search algorithm to prune out unlikely hypotheses or search paths. A beam search requires the computation of a reference score referred to as the least upper bound (LUB) on the log probability of the most likely hypothesis. The word score refers to a negative logarithmic probability; high scores typically mean low probabilities and low scores typically mean high probabilities. The use of beam control in continuous speech recognition (CSR) systems makes use of a static value, the beam width, to control the likelihood range (according to the best likelihood value) that all search paths may have at a certain time.

The four stages comprising the conventional Viterbi search algorithm are pre-processing stage 110, initialization stage 120, recursion stage 130, and termination stage 140. One should note, that in speech recognition systems, pre-processing stage 110 may not be completely performed before the other stages execute. There may be several reasons that pre-processing stage 110 may not complete before the other stages, such as: all of the speech models that are taken into account during recognition are not known before recognition begins due to concatenation of Hidden Markov Models (HMMs) dependent on intermediate recognition results, the impossibility of listing all word sequences for continuous speech recognition or, or on-line decoding input observation data may not be accessible. For every speech model, $\phi_n$ (where $\phi_n$ may be all models for all possible utterances, the utterance HMM, or concatenated HMMs), where n=1, ..., M, the four stages are performed as follows:

Pre-Processing 110:

$\tilde{\pi}_i = \log(\pi_i), 1 \leq i \leq N$ $\tilde{b}_i(\bar{o}_t) = \log(b_i(\bar{o}_t)), 1 \leq i \leq N, 1 \leq t \leq T$ $\tilde{a}_{ij} = \log(a_{ij}) 1 \leq i, j \leq N$ initialization 120:

$\delta_1(j) = \tilde{\pi}_j + \tilde{b}_j(\bar{o}_t), 1 \leq j \leq N_m$ recursion 130:

$\tilde{\delta}_t(j) = \max_{1 \leq i \leq N} [\tilde{\delta}_{t-1}(i) + \tilde{a}_{ij}] + \tilde{b}_j(\bar{o}_t), 2 \leq t \leq T, 1 \leq j \leq N$ termination 140:

$\tilde{P}_m^* = \max_{1 \leq i \leq N} [\tilde{\delta}_T(i)]$ $\tilde{p}_m^* = _{1 \leq i \leq N}^{\max} [\tilde{\delta}_T(i)]$ where the score $\tilde{\delta}_t(j)$ is an approximation of the logarithm of the probability for the most probable path passing node j at the time t and $\tilde{p}_m^*$ is the logarithm of the probability for the most probable path ending at node N at time T. The resulting recognition (i.e., the word to which the unknown speech signal corresponds) is $\hat{\lambda} = \lambda_m$ where $m = \arg\max_{m} \max_{1 \leq m \leq M} \tilde{P}_m^*.$ In pre-processing stage 110, logarithmic values of the initial state probability $\pi_i$ for i=1, ..., N, the description of the feature probability distribution $b_i(\vec{o}_t)$ where $1 \leq i \leq N$ and $1 \leq t \leq T$ and the state transition probabilities $a_{ij}$, where $i \geq 1$ and j is $\leq N$, are computed and stored in memory. The function $b_j(o)$ and the values of the initial state probability $\pi_i$ and the state transition probabilities $a_{ij}$ generally depend upon the particular speech model $\phi_m$ being considered. In order to decrease the amount of data described in the models, however, some constants are set equal regardless of the model. For example, initial state probabilities may be set to $\pi_1=1$, $\pi_i=0$ when i>1 for all speech models. The values that are determined during the preprocessing stage are sometimes computed and stored once.

In initialization stage 120, the path scores $\delta_1(i)$ are calculated at time 1 for state i=1, ... N, at time t=2, ... T and state j=1, ... N.

In recursion stage 130, the scores $\delta_t(j)$ are calculated for state i, ranging from 1 to N, at time t where $2 \leq t \leq T$ and state j, where 1 is $\leq j \leq N$. During termination stage 140, the highest probability result (or best path score) for each specific model is determined from the calculations obtained in recursion stage 130. An overall best path score is obtained by comparing the best path scores obtained for each model.

In one embodiment of the invention, a beam control mechanism dynamically adjusts the beam width according to clues during recognition to improve performance. At the beginning of speech recognition, a wider beam width should be used due to the uncertainty of what was spoken, while a narrower beam can be used as more clues are obtained. In other words, a constant beam width may work well for one speech utterance, but may not work well for the middle of the utterance or may be too large for other parts of speech utterances, which results in processing many useless hypotheses. Therefore, according to one embodiment of the invention, a beam control method dynamically adjusts the beam width according to clues learned during recognition.

One embodiment of the invention will be described as follows. Let $\Phi_t$ denote a set of active paths of time t. Let $N_t$ be defined as the number of paths in $\Phi_t$. Let $p(\phi)$ be defined as the likelihood value of any path $\phi \in \Phi_t$. Let $\alpha_t$ be defined as the best likelihood value within $\Phi_t$, $\alpha_0=0$. Then, $$\alpha_t = \max_{\phi \in \Phi_t} p(\phi)$$

Also let β be defined as the beam width.

In one embodiment of the invention, $\Phi_t$ with the beam width β, means discarding those paths that have $p(\phi)<(\alpha_t-\beta)$ (i.e., pruning). In one embodiment of the invention, the beam width $\beta_t$ of time t is chosen proportionally to some initial beam width B as: $\beta_t=b_t \times B$, where $b_t$ is defined as follows:

$$b_t = \begin{cases} b_1 & \text{if } b'_t < b_1 \\ b_2 & \text{if } b'_t > b_2 \\ b'_t & \text{otherwise} \end{cases}$$

where $b'_0 = b'_1 = B$, $b_t = \frac{\alpha_{t-1} - \alpha_{t-2}}{\alpha_{t-1}} \times t, t > 2$ and $[b_1, b_2]$ is the range of coefficients, which are determined heuristically. For example, the initial values for $\alpha_t$ and $b_t$ can be $\alpha_1=0$ and $b_0=1$. Then, the beam width, $\beta_t$, is dynamically adjusted to reduce processing time while keeping word error rate (WER) low.

Figure 2:
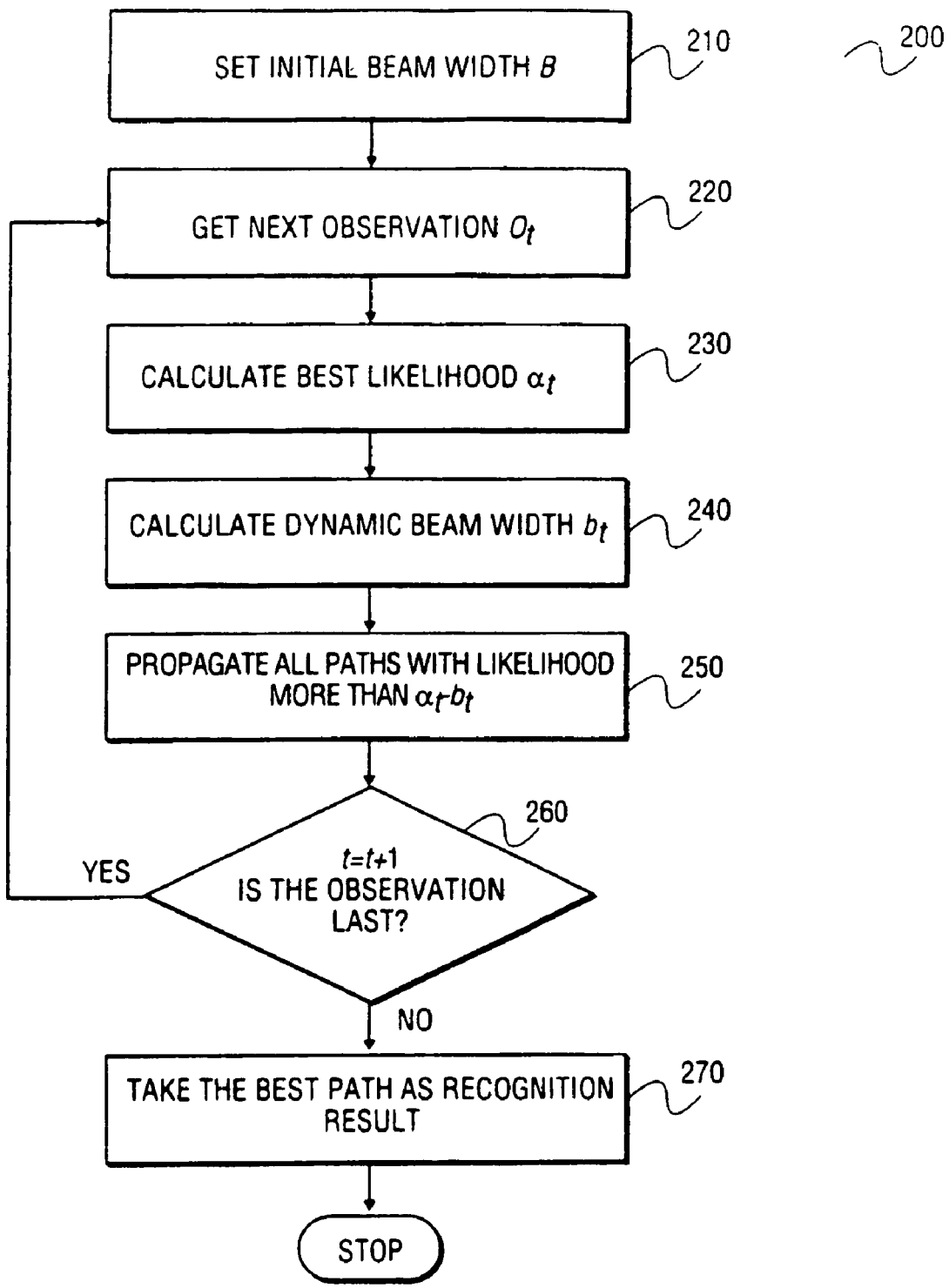
FIG. 2 illustrates a block diagram of an embodiment of the invention having dynamic beam control.

FIG. 2 illustrates a block diagram of an embodiment of the invention having dynamic beam width process 200. After initially testing a speech recognition system, an optimal parameter set is selected based on optimal decoding speed and WER. The decoding speed and WER are determined based on the number of active hypotheses. For instance, the more active hypotheses, the slower the decoding rate and less number of errors.

In a beam search, all hypotheses that are worse on the chosen beam width than the best hypotheses are pruned. In block 210, process 200 initializes the beam width to a predetermined value. The predetermined value is based on the optimal parameter set. Block 220 retrieves the next speech frame (observation). Block 230 determines the best likelihood of the best hypotheses. Block 240 determines the value of the beam width to determine hypotheses for the current speech frame. If block 240 determines that the likelihood value per frame is increasing (the score grows slower), process 200 decreases the beam width from the pre-selected initial beam width to rise in decoding speech.

Block 240 also determines if the likelihood value per frame is decreasing (the score is growing faster). If block 240 determines that the likelihood value per frame is decreasing then block 240 increases the beam width. In one embodiment of the invention, block 240 decreases/increases the beam width by a user selected increment. In another embodiment of the invention, the speech recognition system automatically decreases/increases the beam width by a small increment based on chosen percentage, such as 10%. It should be noted that other methods of decreasing or increasing the beam width may be implemented without deviating from the various embodiments of the invention.

Process 200 continues with block 250. Block 250 propagates all active paths with the new beam width (dynamically modified). Block 260 determines if the speech utterance decoding is complete. If block 260 determines that decoding is not complete, process 200 continues with block 220. If block 260 determines that the decoding is completed, process 200 continues with block 270. Block 270 determines that the best path is the speech recognition result.

With process 200 increasing, decreasing, or maintaining the current beam width while decoding speech input, WER is not compromised while increasing the rate at which decoding completes (i.e., decreasing decoding time).

Table I illustrates results from an example using an embodiment of the invention having a dynamic beam control process for a Chinese language speech recognition task. One should note that other languages may also be input for recognition purposes. In Table I, it can be seen that by using an embodiment of the invention having dynamic beam control on the Chinese language recognition task, the embodiment of the invention improved speed by sixty percent (60%), i.e. real time rate from 3.14 to 1.24. One should note that the real time rate is the central processing unit (CPU) time required for decoding completion divided by the duration of speech. In other words, if the real time rate is less than 1, then on-line decoding (decoding with the speed of a person that is speaking) is possible.

TABLE I

Dynamic Beam Control for Chinese Task

|  | Static Beam | Dynamic Beam |
| --- | --- | --- |
| Real-time Rate | 3.14 | 1.24 |
| Word Error Rate | 8.4 | 8.3 |

Table II illustrates results from an example of using an embodiment of the invention having dynamic beam control for an English language speech recognition task. In Table II, the embodiment of the invention improved speed on the English language task by forty-five percent (45%) (real time rate from 3.4 to 1.85). In the Chinese language task and the English language task, no significant increase in WER is observed. Note that the results illustrated in Table I and in Table II were achieved using a 550 MHz Intel Pentium® processor machine having a cache memory of 512 K and a 512 megabyte synchronous dynamic random access memory (SDRAM). One should note that other systems may also be used with embodiments of the invention having different processing speeds and memory.

For the Chinese language and English language task examples, the initial beam value was set to 140 and 180, respectively. The same co-efficient range $[b_1, b_2]$ was used and set to [0.5, 1.05].

TABLE II

Dynamic Beam Control for English Task

|  | Static Beam | Dynamic Beam |
| --- | --- | --- |
| Real-time Rate | 3.4 | 1.85 |
| Word Error Rate | 11 | 11.4 |

In one embodiment of the invention, a dynamic beam control is used in a Viterbi search having the beam width adjusted only if there exists a normal number of active paths (not too many or too few). For this embodiment, let $\beta'_N$ denote a beam width, where there will be exactly N active paths left in $\Phi_t$ after pruning. The beam width $\beta_t$ of time t is chosen as follows:

$$\beta_t = \begin{cases} \infty, & N_t < 2N_1 \\ \beta'_{N_2}, & 2N_1 \le N_1 < 2N_2 \\ b_t \times B, & 2N_2 \le N, \le 2N_3 \\ \beta'_{N_2}, & 2N_1 < N_t \end{cases} \quad 2)$$

where $0 < N_1 < N_2 < N_3$ are pre-defined thresholds and B is the initial beam width. The value $b_t$ is estimated from the following:

$$b_t = \begin{cases} b_1 & \text{if } b'_t < b_1 \\ b_2 & \text{if } b'_t > b_2 \\ b'_t & \text{otherwise} \end{cases}$$

In this embodiment of the invention, the beam width is adjusted only if there exists a normal number of active paths (not too many or too few), namely in the range of $[2N_2, 2N_3]$. In this embodiment of the invention, if the number of active paths falls out of the range $[2N_2, 2N_3]$, then pruning is performed to ensure the number of active paths fall back into the range. If the total number of active paths is less than a threshold $N_1$, no pruning is performed [i.e., infinity beam width].

Figure 3:
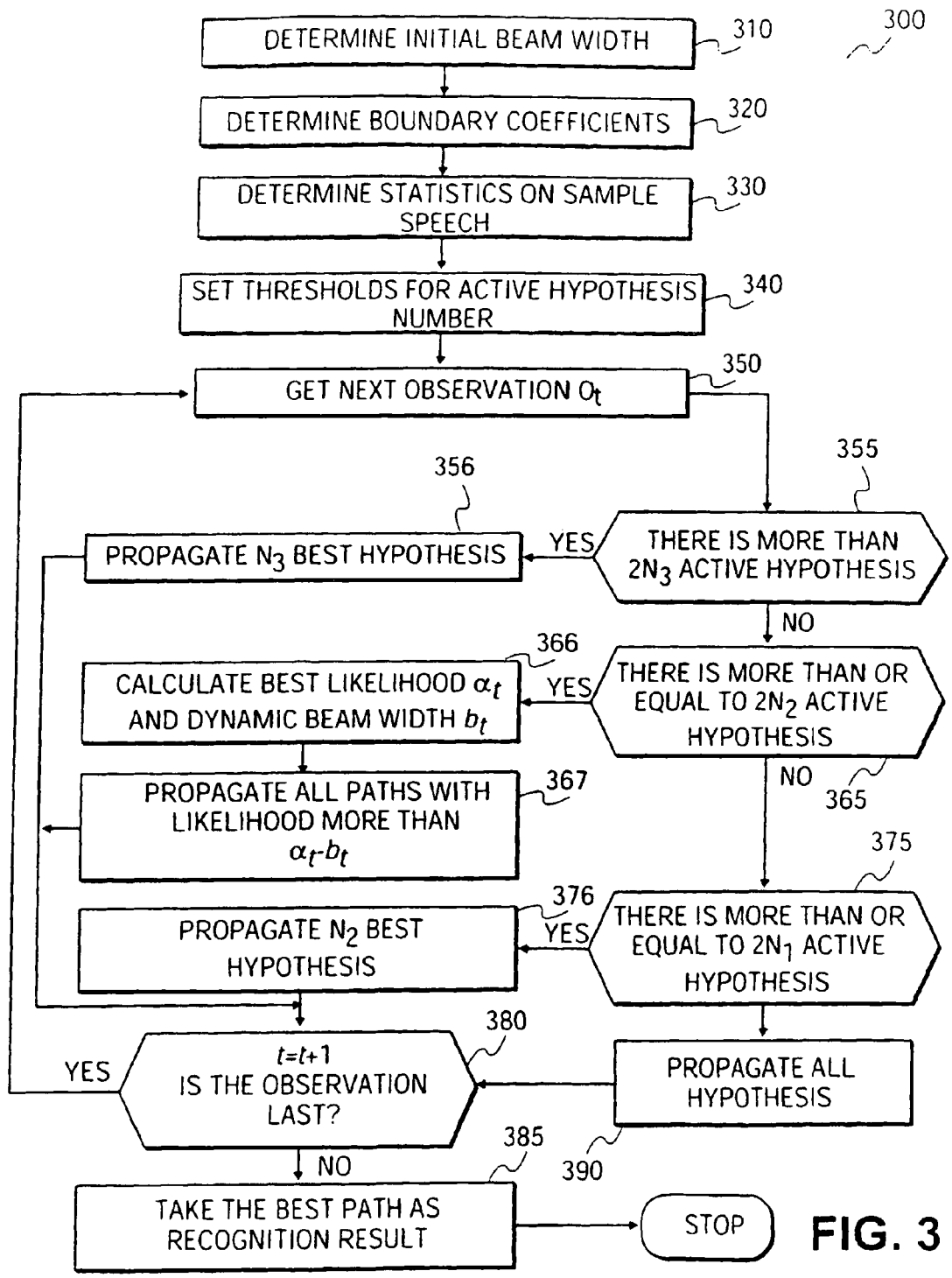
FIG. 3 illustrates a block diagram of an embodiment of the invention having dynamic beam control (when there are enough active paths) or N-best decoding (if there are too few or too many active paths).

FIG. 3 illustrates an embodiment of the invention having process 300 that adjusts the beam width during decoding only if there exists a normal number of active paths (not too many or too few) paths or uses N-best decoding when there are too few or too many active paths. In an N-best decoding method, for every time frame, only N-best hypotheses will continue, while other hypotheses are pruned. Therefore, the list of N-best hypotheses can be re-scored. Process 300 begins with block 310 that determines the initial beam width.

The initial beam width is determined by performing speech recognition on a sample of the speech input. Process 300 continues with block 320 that determines boundary coefficients. After initially testing a speech recognition system, an optimal parameter set is selected based on optimal decoding speed and WER. The decoding speed and WER are determined based on the number of active hypotheses. Process 300 continues with block 330 that determines statistics on a sample of the input speech. Once block 330) has initially ran a sample of the speech input and determines statistics on this input, block 340 then sets a threshold for active hypotheses. Note that the thresholds are set according to equation 2. In one embodiment of the invention the threshold $2N_3$ is such a number of hypotheses that this threshold is exceeded for only approximately 10% of the time frames. In one embodiment of the invention the threshold $2N_2$ is such a number of hypotheses that for approximately 10% of the time frames they are less than $2N_2$ hypotheses. One should note that other thresholds may be used in other embodiments of the invention.

In one embodiment of the invention, the threshold $N_t$ is set equal to $N_2/5$. Note that threshold $N_1$ is used for critical cases when there are very few hypotheses. In one embodiment of the invention, blocks 310-340 can be separated from process 300 and can be performed during speech recognition building and testing or can be performed while the speech recognition system is adapted (implicitly or explicitly) to a speaker and/or the environment.

Process 300 continues with block 350 where the next observation (or utterance) is retrieved. Process 300 continues with block 355. Block 355 determines whether the number of active hypotheses is greater than $2N_3$. If block 355 determines that the number of active hypotheses is greater than $2N_3$, then process 300 continues with block 356. Block 356 performs an N-best decoding with N set to $N_3$. For this case, it is sufficient to keep the same WER.

By setting $N=N_3$, decoding is accelerated. If block 355 determines that the number of active hypotheses is not greater than $2N_3$, then process 300 continues with block 365.

Block 365 determines whether the number of active hypotheses is greater than or equal to $2N_2$. If block 365 determines that the number of active hypotheses is greater than or equal to $2N_2$, then process 300 continues with block 366. Block 366 determines the best likelihood $\alpha_t$ and the dynamic beam width b, as presented in process 200. Process 300 then continues with block 367 where all paths with a likelihood better than $\alpha_t - b_t$ are propagated Process 300 then continues with block 380.

Block 380 determines whether the next observation was the last observation at time t=t+1. If block 380 determines that the observation is the last observation, then process 300 continues with block 350. If block 380 determines that the observation at time t=t+1 is not the last observation, process 300 continues with block 385. Block 385 then uses the best path as the result of the speech recognition process.

If block 365 determines that the number of active hypotheses is not greater than or equal to $2N_2$, then process 300 continues with block 375.

Block 375 determines whether the number of active hypotheses is greater than or equal to than $2N_1$. If block 375 determines that the number of active hypotheses is greater than or equal to $-2N_1$, then process 300 continues with block 376. Block 376 decodes the active hypotheses with N-best decoding with N set equal to $N_2$. Process 300 then continues with block 380. If block 375 determines that the number of active hypotheses is not greater than or equal to $2N_1$, then process 300 continues with block 390. Block 390 then propagates all hypotheses.

Table III illustrates comparison results from statistical speech recognition using Viterbi search for a static beam, an embodiment of the invention having a dynamic beam control process (process 200), and an embodiment of the invention using dynamic beam control where the beam width is adjusted only if there exists a normal number of active paths (not too many or too few) paths or uses N-best decoding when there are too few or too many active paths (Process 300), for a task of recognizing Chinese language. One should note that other languages may also be used in recognition tasks with embodiments of the invention.

In Table III, the results illustrated for an embodiment of the invention (modified dynamic beam width process; third column) having dynamic beam control (process 200) and dynamic beam control where there exists a normal number of active paths (not too many or too few) paths or uses N-best decoding when there are too few or too many active paths active paths (process 300), the first pass only used an embodiment of the invention having dynamic beam control (200) and the second pass used an embodiment of the invention having dynamic beam control where the beam width is adjusted only if there existed "enough" active paths (process 300).

In Table III, using an embodiment of the invention having a modified dynamic beam process (third column) achieved WER improvement from 8.3 to 7.8, compared with an embodiment of the invention only having dynamic beam control without adjusting the beam width only when there exists a normal number of active paths (not too many or too few) paths or that uses N-best decoding when there are too few or too many active paths active paths. The results of the example illustrated in Table III is for an embodiment of the invention using the same parameters as the embodiment of the invention whose results are illustrated in Table I, with the parameters for the embodiment using both dynamic beam control and dynamic beam control where the beam width is adjusted only if there exists a normal number of active paths (not too many or too few) paths or uses N-best decoding when there are too few or too many active paths of $N_1=160$, $N_2=800$ and $N_3=5000$.

TABLE III

Dynamic Beam Control for Chinese Task

|  | Static Beam | Dynamic Beam | Modified Dynamic Beam |
| --- | --- | --- | --- |
| Real-time Rate | 3.14 | 1.24 | 1.32 |
| Word Error Rate | 8.5 | 8.3 | 7.8 |

Table IV illustrates a comparison of results for an English language task of a Viterbi search using a static beam, an embodiment of the invention having dynamic beam control, and an embodiment of the invention having a modified dynamic beam control process where the beam width is adjusted only if there exists a normal number of active paths (not too many or too few) paths or uses N-best decoding when there are too few or too many active paths active paths. One should note that other language recognition tasks can be used with embodiments of the invention.

The results illustrated in Table IV for an embodiment of the invention use the same parameters as the embodiment of the invention whose example results are illustrated in Table II, with the following parameters for the embodiment of the invention having dynamic beam control and dynamic beam control where the beam width is adjusted only if there exists a normal number of active paths (not too many or too few) paths or uses N-best decoding when there are too few or too many active paths of $N_1=300$, $N_2=1500$ and $N_3=6000$. The results in Table IV illustrate that an improved WER of 11.4 to 11 resulting from comparison of the embodiment of the invention having dynamic beam control for first pass and dynamic beam control where the beam width is adjusted only if there exists a normal number of active paths (not too many or too few) paths or uses N-best decoding when there are too few or too many active paths for second pass. The results illustrated in Tables III and IV were measured using a 550 MHz Intel Pentium™ processor machine with 512 K cache and 512 Mb SDRAM. One should note that other processor speeds and memory configurations may also be used with embodiments of the invention.

TABLE IV

Dynamic Beam Control for English Task

|  | Static Beam | Dynamic Beam | Modified Dynamic Beam |
| --- | --- | --- | --- |
| Real-time Rate | 3.4 | 1.85 | 1.95 |
| Word Error Rate | 11 | 11.4 | 11 |

It should be noted that the above discussed embodiments of the invention can be applied to tasks where the number of hypotheses are too large to be determined in a reasonable amount of time, and where beam width pruning should normally be applied.

Figure 4:
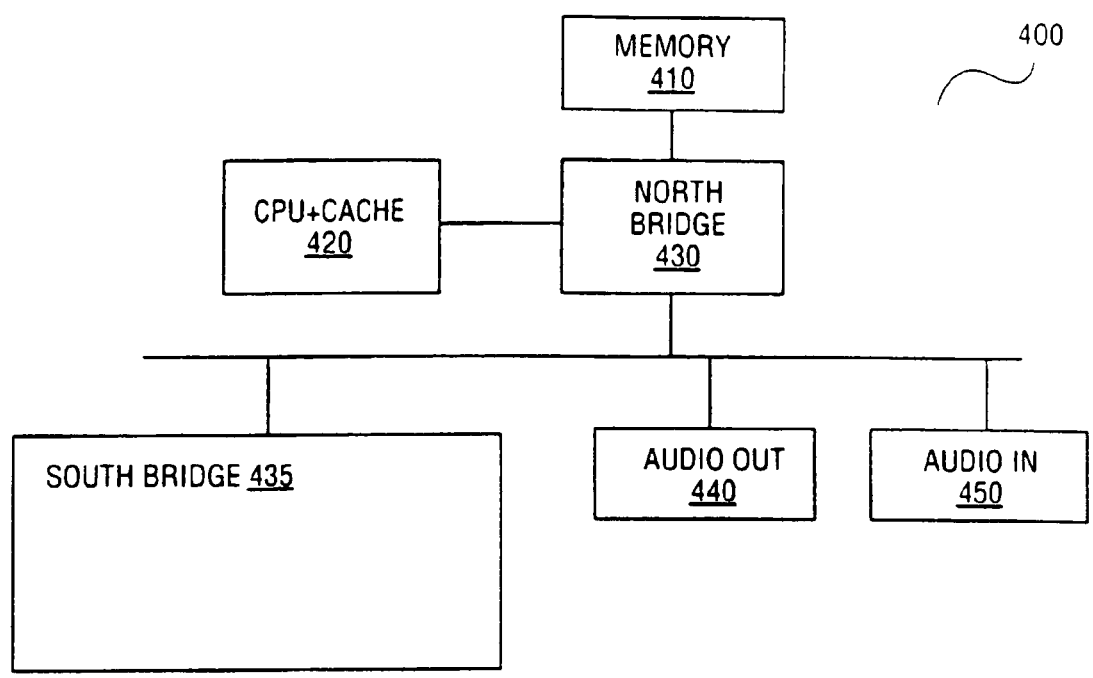
FIG. 4 illustrates a typical system that can be used for speech recognition tasks.

FIG. 4 illustrates a typical system 400 that may be used for speech recognition applications. System 400 comprises memory 410, central processing unit (CPU) plus local cache 420, north bridge 430, south bridge 435, audio out 440, and audio in 450. Audio out device 440 may be a device such as a speaker system. Audio in device 450 may be a device such as a microphone.

Figure 5:
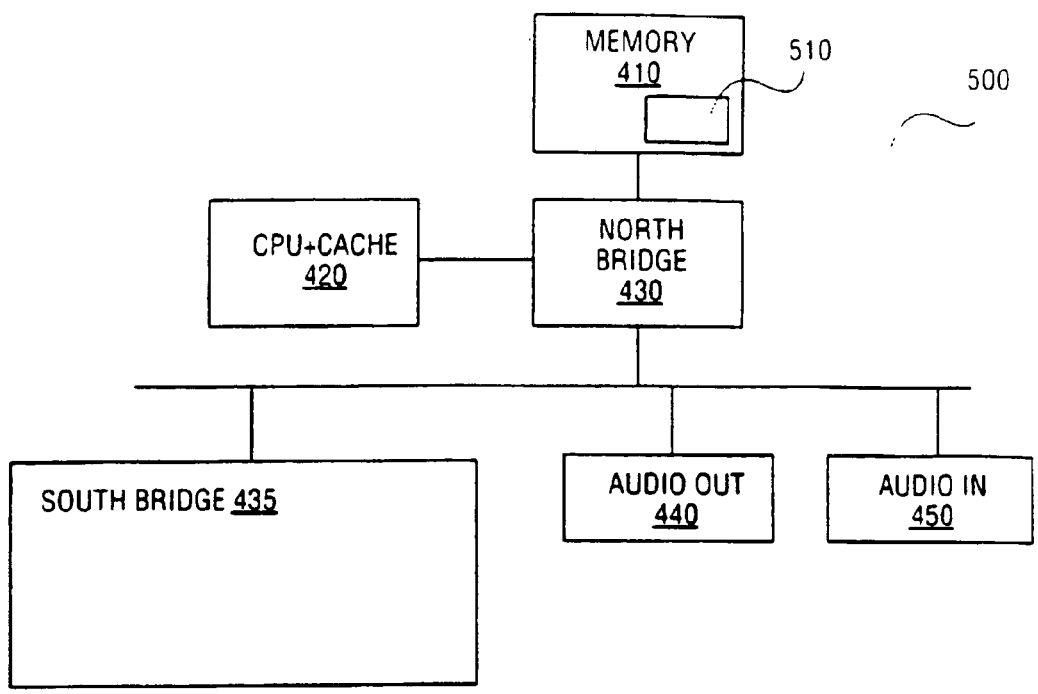
FIG. 5 illustrates an embodiment of the invention having a dynamic beam control process included in a system.

FIG. 5 illustrates system 500 having an embodiment of the invention including dynamic beam width process 510. In one embodiment of the invention, dynamic beam width process 510 is implemented as process 200 (illustrated in FIG. 2). In another embodiment of the invention, dynamic beam width process 510 is implemented as process 300 (Illustrated in FIG. 3). In another embodiment of the invention, dynamic beam width process 510 is implemented using both process 200 and process 300, where process 200 is used for first pass, and process 300 is used for other passes. Process 510 may be implemented as an application program in memory 410. Memory 410 may memory devices such as random access memory (RAM), dynamic RAM, or synchronous DRAM (SDRAM). It should be noted that other memory devices may also be used, including future developments in memory devices. It should also be noted that dynamic beam width process 510 may also be implemented on other readable mediums, such as a floppy disc, compact disc read-only memory (CD-ROM), etc.

Figure 6:
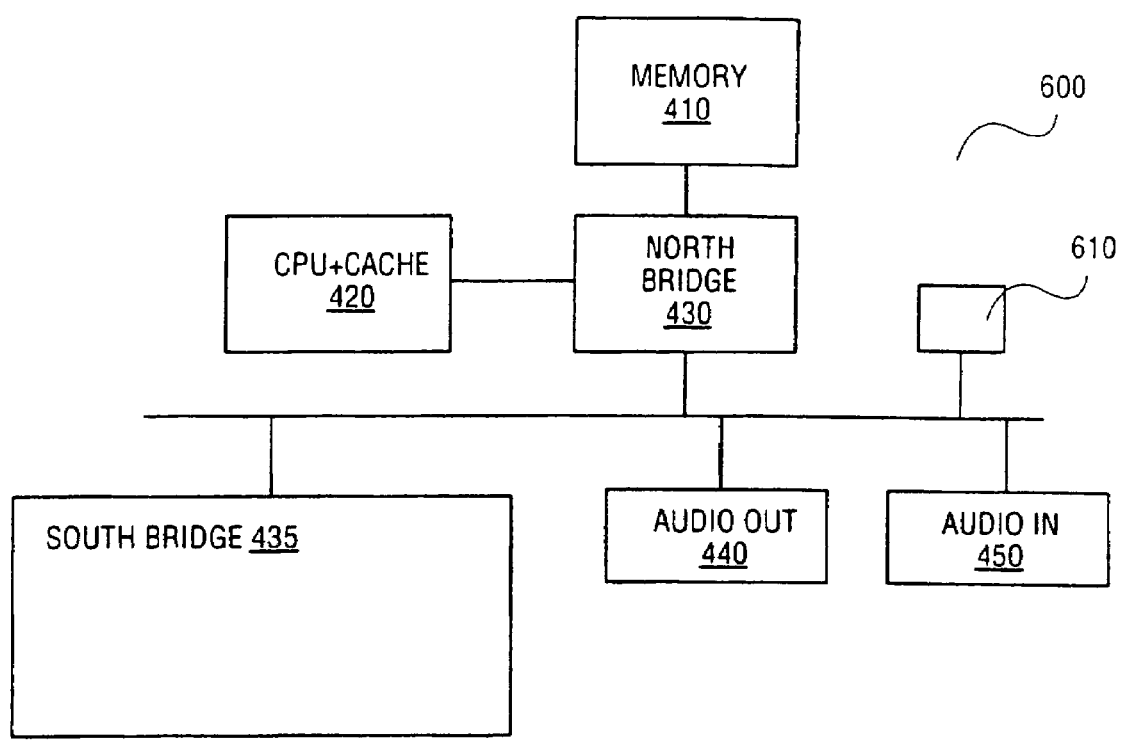
FIG. 6 illustrates an embodiment of the invention having a dynamic beam control circuit.

FIG. 6 illustrates an embodiment of the invention having process 610 (illustrated in FIG. 5 as process 510) implemented in hardware. In one embodiment of the invention, process 610 is implemented using programmable logic arrays (PLAs). It should be noted that process 510 can be implemented using other electronic devices, such as registers and transistors. In another embodiment of the invention, process 610 is implemented in firmware.

By using embodiments of the invention during speech recognition processing using a Viterbi search method, processing speed is increased without increasing WER. Therefore, less time is necessary to complete speech recognition tasks.

"The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices;. The device or machine-readable medium may include a solid state memory device and/or a rotating magnetic or optical disk. The device or machine-readable medium may be distributed when partitions of instructions have been separated into different machines, such as across an interconnection of computers."

What is claimed is:

1. A method comprising:
    selecting an initial beam width;
    determining for a frame of input voice data a corresponding probability of each hypothesis in a set of hypotheses of a speech recognition model;
    determining a highest probability from among the determined probabilities for the frame of input voice data;
    pruning a hypothesis from the set of hypotheses of the speech recognition model to create a pruned set of hypotheses, the pruning based on the initial beam width and the determined highest probability;
    determining a change in a likelihood of a best hypotheses per frame resulting from the creating the pruned set of hypotheses;
    dynamically adjusting the beam width based on the determined change in the likelihood of the best hypotheses per frame; and decoding a speech input with the dynamically adjusted beam width.

2. The method of claim 1, said decoding including pruning a set of active paths with the dynamically adjusted beam width.

3. The method of claim 1, said decoding further including using a hidden Markov model (HMM).

4. The method of claim 3, wherein the HMM is a Viterbi scoring search.

5. The method of claim 1, said dynamically adjusting including determining a first boundary coefficient and a second boundary coefficient based on heuristics.

6. A method comprising:
determining an initial beam width;
determining a plurality of threshold values for a plurality of active hypotheses of a speech recognition model, each of the active hypotheses corresponding to a respective probability for a frame of input voice data, the plurality of threshold values defining a first ranger;
determining a current number of the plurality of active hypotheses; if the current number of active hypotheses is within the first range,
determining a highest probability from among the probabilities of each of the active hypotheses for the frame of input voice data,
dynamically adjusting the beam width based on the current number of active hypothesis and the threshold values, and
selectively propagating one or more of the active hypotheses based on the determined highest probability and the dynamically adjusted beam width; and
decoding a speech input based on the selectively propagated one or more hypotheses.

7. The method of claim 6 said decoding further including using a hidden Markov model (HMM).

8. The method of claim 7, wherein the HMM is a Viterbi scoring search.

9. The method of claim 6 said dynamically adjusting including determining a first boundary coefficient and a second boundary coefficient based on heuristics.

10. The method of claim 6, said determining the plurality of threshold

11. The method of claim 6 wherein the plurality of threshold values further defines a second range, the method further comprising:
if the current number of active hypotheses is within the second range, selectively propagating one or more of the active hypotheses on an N-best basis. values comprises determining statistics on a sample of the speech input.

12. An apparatus comprising a machine-readable storage medium containing instructions which, when executed by a machine, cause the machine to perform operations comprising:
selecting an initial beam width;
determining for a frame of input voice data a corresponding probability of each hypothesis in a set of hypotheses of a speech recognition model;
determining a highest probability from among the determined probabilities for the frame of input voice data;
pruning a hypothesis from the set of hypotheses of the speech recognition model to create a pruned set of hypotheses, the pruning based on the initial beam width and the determined highest probability;
determining a change in a likelihood of a best hypotheses per frame resulting from the creating the pruned set of hypotheses;
adjusting the beam width dynamically based on the determined change in the likelihood of the best hypotheses per frame; and decoding a speech input with the dynamically adjusted beam width.

13. The apparatus of claim 12, said decoding including pruning a set of active paths with the dynamically adjusted beam_width.

14. The apparatus of claim 13, said decoding further including using a hidden Markov model (HMM).

15. The apparatus of claim 14, wherein the HMM is a Viterbi scoring search.

16. The apparatus of claim 14, said adjusting
determining a first boundary coefficient and a second boundary coefficient based on heuristics.

17. An apparatus comprising a machine-readable storage medium containing instructions which, when executed by a machine, cause the machine to perform operations comprising:
determining an initial beam width;
determining a plurality of threshold values for a plurality of active hypotheses of a speech recognition model, each of the active hypotheses corresponding to a respective probability for a frame of input voice data, the plurality of threshold values defining a first range;
determining a current number of the plurality of active hypotheses; if the current number of active hypotheses is within the first range,
determining a highest probability from among the probabilities of each of the active hypotheses for the frame of input voice data,
adjusting the beam width dynamically based on the current number of active hypothesis and the threshold values, and
selectively propagating one or more of the active hypotheses based on the determined highest probability and the dynamically adjusted beam width; and
decoding a speech input based on the selectively propagated one or more hypotheses.

18. The apparatus of claim 17, said decoding further including using a Viterbi scoring search.

19. The apparatus of claim 17, wherein the plurality of threshold values further defines a second range, the operations further comprising:
if the current number of active hypotheses is within the second range, selectively propagating one or more of the active hypotheses on an N-best basis.

* * * * *

UNITED STATES PATENT AND TRADEMARK OFFICE
CERTIFICATE OF CORRECTION

PATENT NO. : 7,493,258 B2  Page 1 of 1
APPLICATION NO. : 10/482400
DATED : February 17, 2009
INVENTOR(S) : Kibkalo et al.

It is certified that error appears in the above-identified patent and that said Letters Patent is hereby corrected as shown below:

In column 11, at line 41 after, -- threshold — insert --values comprises determining statistics on a sample of the speech input--.

In column 11, at line 30 after, -- basis. — delete "values comprises determining statistics on a sample of the speech input".

In column 12, at line 21 after, -- adjusting — insert --including--.

Signed and Sealed this

Thirty-first Day of August, 2010

David J. Kappos
*Director of the United States Patent and Trademark Office*